2,929,758

PROCESSES FOR THE CONTROL OF IRON BACTERIA AND COMPOSITIONS FOR USE THEREIN

Stanley J. Buckman, Raleigh, and John D. Pera and John W. Appling, Memphis, Tenn., assignors to Buckman Laboratories, Inc., Memphis, Tenn., a corporation of Tennessee No Drawing. Application September 23, 1957
Serial No. 685,405

8 Claims. (Cl. 162—161)

The present invention relates to processes for the control of iron bacteria, particularly bacteria of the genus Sphaerotilus, and compositions for use therein. The invention also relates to the control of slimes in papermaking operations, particularly those in which a species of the Sphaerotilus genus or other iron bacterium is an associated microorganism. The invention pertains to the use of compositions containing water-soluble salts of N-substituted monoalkyldithiocarbamates for such purposes.

Slime consists of matted deposits of microorganisms, fibers, and debris, and it may be stringy, pasty, rubbery, tapioca-like, hard, or horny, and it may have a characteristic odor that is quite unlike that of the liquid suspensions in which it is formed. The microorganisms involved in its formation are primarily different species of sporeforming and nonsporeforming bacteria, particularly capsulated forms of bacteria which secrete gelatinous substances that envelop or encase the cells. Slime microorganisms also include filamentous bacteria, filamentous fungi of the mold type, yeasts, and yeastlike organisms and, in many cases, also include iron bacteria such as *Sphaerotilus natans*, its various morphological forms, as well as other species of Sphaerotilus and other genera. Iron bacteria are principally fouling organisms and are purported to be the cause of extremely bulky slimes. As the slimes break loose, they cause brownish-red spots or stains in the finished paper. In addition, iron bacteria impart offensive tastes and odors to water.

Iron bacteria are the subject of extensive literature, which has been reviewed by E. G. Pringsheim in an article published in Biological Reviews of the Cambridge Philosophical Society, vol. 24, No. 2, pages 200 to 245 (1949). He characterized the numerous papers comprising the literature as of unequal value and regarded it as in need of critical review. The commonest iron bacterium, and that which has been most carefully studied, is *Sphaerotilus natans*. Although iron bacteria may include several genera and a number of species, few, if any, pure cultures are presently available in culture collections. Many of the genera and species of iron bacteria which have been reported are regarded as of doubtful validity by E. G. Pringsheim in his paper, "The Filamentous Bacteria Sphaerotilus, Leptothrix and Cladothrix, and Their Relation to Iron and Manganese," published in the Transactions of the Royal Society (London), Series B, vol. 233, pages 453 to 482 (March 31, 1949).

The results and conclusions disclosed in the present specification are based upon actual experience over long periods with industrial water supplies that have been contaminated with iron bacteria and slimes from paper mills and paper machine wet felts. The culture of *Sphaerotilus natans* that is referred to in the examples herein is an actual isolate from a slime obtained from a paper mill and conforms to cultural and other characteristics described for this species by E. G. Pringsheim in the aforesaid papers, as well as those described by J. L. Stokes in his paper "Studies on the Filamentous Sheathed Iron Bacterium *Sphaerotilus natans*" that is published in the Journal of Bacteriology, vol. 67, pages 278 to 291 (1954), and by James B. Lackey and Elsie Wattie in "Studies of Sewage Purification, XIII, The Biology of *Sphaerotilus natans* Kutzing in Relation to Bulking of Activated Sludge," published in Public Health Reports, vol. 55, No. 22, pages 975 to 987 (May 31, 1940).

Although the term "iron bacteria" conveys only a physiological (biological) and not a taxonomic meaning, it is to be understood herein to include all bacteria and bacteria-like organisms which are characterized by the deposition of ferric hydroxide in a morphologically distinct way, which would be recognized as such by qualified bacteriologists, and consequently includes the better known and characterized genera such as Sphaerotilus and its morphological forms, Leptothrix, and Cladothrix, as well as all such species singly or together which are found in natural slime-forming bacterial microflora. The present invention is consequently applicable directly to all iron bacteria generally.

Little is known of toxicants or agents which inhibit or prevent the growth of iron bacteria. This problem is referred to in TAPPI Monograph No. 15, entitled "Microbiology of Pulp and Paper," published by TAPPI, New York, New York, 1955, in the section entitled "Bulking Slimes: The Iron Bacteria," beginning at page 261. Most toxic materials which were investigated heretofore proved ineffective. In the only report referred to in that monograph in which reference is made to actual testing of toxicants, namely, the paper by Karman Duchon and Lewis B. Miller, "The Effect of Chemical Agents on Iron Bacteria," published in Paper Trade Journal, vol. 126, No. 4, pages 47 to 58 (Tappi Section, pages 37 to 48) (June 22, 1948), chlorine and hypochlorites are the only toxicants suggested which offer promise in the industrial control of iron bacteria. The limitations of chlorine and hypochlorites in the presence of organic matter in industrial process waters are well recognized. The available chlorine is consumed by the organic material and consequently high dosages are necessary to obtain effective control. Such dosages attack wool employed in paper machine wet felts and create corrosion problems with metal equipment in contact with the treated water.

Although alkali-metal and alkaline-earth-metal-N-monoalkyl- and N,N-dialkyldithiocarbamates are known compounds and possess various utilities and certain monoalkyldithiocarbamates are useful nematocides, we have discovered that the monoalkyldithiocarbamates possess high and relatively specific activity against *Sphaerotilus natans*, whereas the corresponding dialkylthiocarbamates possess neither the high order of activity nor the specificity against such iron bacteria, even though they are reportedly much more active against fungi than are monoalkyldithiocarbamates.

In accordance with our discovery, we have found that the growth and proliferation of iron bacteria in water can be inhibited or completely suppressed by addition of water-soluble N-substituted monoalkyldithiocarbamates, the alkyl radicals of which have fewer than four carbon atoms, and particularly by alkali-metal salts of N-methyldithiocarbamic acid. The quantities required for this purpose are small, being in the range of approximately 0.1 and approximately 20 p.p.m. (parts per million) of the water. As indicated in the examples hereinafter, corresponding N,N-dialkyldithiocarbamates, which reportedly have a high order of activity against fungi, are much less active than the N-monoalkyldithiocarbamates in controlling the growth of iron bacteria.

We have also discovered that the water-soluble N-monoalkyldithiocarbamates of this invention may be used in combination with other toxicants and slime-control agents, particularly with water-soluble salts of cyanodithioimidocarbonic acid, which possess a high order of activity against species of the Aerobacter and Pseudomonas genera that are normally associated with slime formation in papermaking operations. When used in combination, either when added separately or together to the same process waters, the activity of the cyanodithioimidocarbonate toward species of Aerobacter and Pseudomonas is not decreased, nor is the activity of the N-monoalkyldithiocarbamate decreased against iron bacteria. Accordingly, slime and iron bacteria can be controlled in paper-mill process waters by the use of combinations of two or more such toxicants, which can conveniently and advantageously be dispensed in the form of concentrated aqueous solutions containing two or more active constituents. Water-soluble salts of N-monoalkyldithiocarbamic acids are compatible with water-soluble cyanodithioimidocarbonates and consequently stable concentrated aqueous solutions of the two may be prepared for such use. Water-soluble salts of N-monoalkyldithiocarbamic acids are also compatible with water-soluble salts of ortho-phenylphenol, 2,4,6-trichlorophenol, and other polychlorophenols, hence concentrated aqueous solutions containing these components may also be prepared and dispensed in this form.

Combinations of toxicants with water-soluble N-monoalkyldithiocarbamates, which are not compatible in concentrated aqueous solutions, may be dispensed in solid particulate form, or in the form of suspensions in water or other liquids, or may be added individually to the process waters, either as solutions or solids. If desired, the process waters may be preliminarily treated with the N-monoalkyldithiocarbamate, to suppress iron bacteria, and thereafter the cyanodithioimidocarbonate or other toxicant for control of other slime-forming microorganisms may be added to the pretreated waters. Examples of toxicants which may be used in such combinations with water-soluble N-monoalkyldithiocarbamates are organomercuric compounds, organotin compounds, and inorganic copper compounds, as well as copper salts of organic compounds.

An especially effective composition for use in accordance with our invention is an aqueous solution containing a mixture of potassium N-methyldithiocarbamate, sodium cyanodithioimidocarbonate, and ethylenediamine in the proportions of approximately 18.0, 13.1, and 4.9 percent by weight respectively. This is essentially a composition containing an alkylene diamine and an alkali-metal cyanodithioimidocarbonate in the proportions disclosed and claimed in the copending application of one of us (John D. Pera), Serial No. 615,102, filed October 10, 1956 (now Patent No. 2,881,070), and an approximately equal weight of an alkali-metal salt of the N-monoalkyldithiocarbamate. For general use, these compositions will contain between approximately 5 and approximately 20 percent by weight of each of the cyanodithioimidocarbonate and the N-monomethyldithiocarbamate.

Sodium N-methyldithiocarbamate and a method for its preparation are described in the article by H. L. Klöpping and G. J. M. van der Kerk, in Recueil des travaux chimiques des Pays-Bas, vol. 70, at page 935 (1951). Our preferred general method for the production of such N-monoalkyldithiocarbamates consists in adding carbon disulfide to a mixture of a primary amine and an alkali-metal hydroxide, each in an equimolecular proportion, in accordance with the following equation, which is exemplary of the production of potassium N-methyldithiocarbamate:

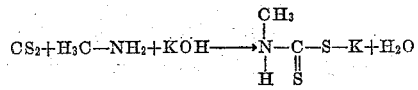

The reaction is exothermic and consequently it is desirable to moderate it by cooling or by adding the carbon disulfide or the amine to the other reactants in small increments. It is not necessary to isolate the resulting compound, which is obtained in substantially stoichiometric yield, since the solution may be used directly as such or mixed with solutions of other toxicants with which it is compatible, as described herein.

Example 1

The effect of potassium N-methyldithiocarbamate and various related compounds on the growth of the iron bacterium, *Sphaerotilus natans*, was determined in this example.

The culture of *Sphaerotilus natans* that was used was isolated from a sample of paper-mill slime, as referred to hereinbefore, stock cultures of which were maintained on Stokes solid agar nutrient medium having the following composition:

|  | Percent by weight |
|---|---|
| Peptone | 0.2 |
| Dextrose | 0.2 |
| Magnesium sulfate ($MgSO_4 \cdot 7H_2O$) | 0.02 |
| Calcium chloride ($CaCl_2$) | 0.005 |
| Ferric chloride ($FeCl_3 \cdot 6H_2O$) | 0.001 |
| Agar | 1.25 |

Tap water sufficient to make 100.00.

which is described by J. L. Stokes in his article on *Sphaerotilus natans* in Journal of Bacteriology, vol. 67, at page 286 (1954). The medium was sterilized by autoclaving and its pH was adjusted to 7.0 with sodium hydroxide.

The tests were performed in accordance with the following modification of the pulp-substrate method described in the article by John W. Appling, N. Jean Ridenour, and Stanley J. Buckman, published in Tappi, vol. 34, No. 8, pages 347 to 352, beginning at page 350 (August 1951).

To 180-ml. Pyrex milk-dilution bottles fitted with Escher rubber stoppers, 40-gram portions of tap water (which has a natural content of minerals and a pH value favorable to the survival of the test organism) were added. After sterilizing these bottles and their contents, the following substances were added to each in the following order:

(1) Sterile tap water that is required in each individual case to bring the total weight of the contents of each bottle to 50 grams, after all subsequent additions specified hereinafter (including inoculation with the aqueous suspension of test organism) have been made.

(2) Compound to be evaluated in such individual quantities as to give the concentration desired in each test. The amount is computed and reported in parts per million by weight of the compound.

(3) Inoculum consisting of 1 milliliter of a suspension of the test organism, *Sphaerotilus natans*, in sterile tap water, which was prepared by harvesting from Stokes agar-slant cultures incubated for 24 hours at 28° C., such amounts of cells as to provide a cell count in excess of approximately 500,000 per milliliter.

After the test organism had been added to the bottles, they were allowed to stand for a period between 18 and 20 hours at an incubation temperature of approximately 28° C., at which time a portion of the contents of each bottle was withdrawn, diluted, and plated on Stokes solid nutrient agar and incubated for 48 hours at 28° C. The number of colonies on each plate was determined and the results were converted to the number of colonies per milliliter of substrate.

From these data, the percentage kills were calculated as described in the article in Tappi referred to hereinbefore. The difference between the count for the control substrate (with no toxicant) and the count obtained from the substrate containing toxicant is divided by the count for the control substrate to give the fraction killed, which is then converted to "percentage kill" by multiplication by 100. A kill of 80 percent or higher represents a useful toxicant, and it does not necessarily follow that higher percentage kills are better or more desirable.

The compounds which were included in the tests in this example are as follows:

A—Potassium N-methyldithiocarbamate
B—Potassium N,N-dimethyldithiocarbamate
C—Potassium N-ethyldithiocarbamate
D—Potassium N,N-diethyldithiocarbamate
E—Potassium N-n-propyldithiocarbamate
F—Potassium N-isopropyldithiocarbamate
G—Potassium N-n-butyldithiocarbamate
H—Potassium N,N-di-n-butyldithiocarbamate The results of these tests appear in the following table as percentage kills at concentrations in p.p.m. of the compounds. All of the compounds that were tested were prepared in the form of aqueous solutions containing 36 percent by weight of the compounds, except Compounds G and H, which were prepared at a concentration of 18 percent, but all compounds were tested at the same concentrations. It will be noted that the series of concentrations that are reported in the table represent the equivalents of 0.2, 0.4, 0.6, 0.8, 1.0, 2.0, 4.0, 8.0 and 16.0 p.p.m. of a 36-percent solution of the compound.

| Concentration, p.p.m. | Percentage kill for compound— | | | | | | | |
|---|---|---|---|---|---|---|---|---|
| | A | B | C | D | E | F | G | H |
| 0.072 | 47 | 99 | 52 | 42 | 17 | 13 | 31 | 36 |
| 0.144 | 85 | 92 | 35 | 38 | 67 | 57 | 15 | 25 |
| 0.216 | 96 | 68 | 30 | 40 | 63 | 29 | 70 | 43 |
| 0.288 | 99 | 68 | 89 | 86 | 90 | 62 | 18 | 71 |
| 0.360 | 99 | 72 | 99 | 42 | 95 | 91 | 12 | 0 |
| 0.720 | 99 | 76 | 99 | 2 | 91 | 86 | 38 | 14 |
| 1.440 | 99 | 96 | 99 | 18 | 98 | 99 | 37 | 98 |
| 2.880 | 100 | 100 | 100 | 66 | 99 | 98 | 71 | 51 |
| 5.760 | 99 | 100 | 100 | 34 | 99 | 98 | 40 | 30 |

The foregoing results indicate that, of these various mono- and dialkyl-substituted dithiocarbamates, those which contain only one N-alkyl substituent and those whose sole N-alkyl substituent contains fewer than four carbon atoms are the most consistently active against iron bacteria throughout the concentration range that was studied, which is the most economical range. The results for Compound B (N,N-dimethyldithiocarbamate) indicate an inversion which precludes the use of that compound in an industrially satisfactory manner.

Example 2

The purpose of this example was to determine the effect, if any, that N-monoalkyldithiocarbamates might have when used together with other toxicants that have a high activity against other slime-forming organisms, such as species of the genera Aerobacter and Pseudomonas, in the pulp-substrate test method described by John W. Appling, N. Jean Ridenour, and Stanley J. Buckman, that is referred to in Example 1.

The tests in this example were carried out in the same 180-ml. dilution bottles that were used in Example 1, to each of which was added a 40-gram portion of an aqueous slurry of spruce groundwood containing 1 percent by weight (dry basis) of wood fibers. These bottles containing the pulp substrate were then sterilized and to each was added the following substances in the following order:

(1) Sterile distilled water that is required in each individual case to bring the total weight of the contents of each bottle to 50 grams, after all subsequent additions specified hereinafter (including inoculation with the aqueous suspension of test organism) have been made.

(2) One milliliter of a 2.0-percent-by-weight sterile solution of rosin size. Rosin size is the pasty sodium soap of rosin containing approximately 20 to 30 percent free rosin and 30 percent water. A suitable rosin size is that known as rosin size 70D made by the Papermakers' Chemical Department, Hercules Powder Co., Kalamazoo, Michigan.

(3) Solution of toxicant or control agent to be evaluated in such individual volumes as give the concentration desired in each test; the amount is computed in parts per million by weight.

(4a) Sterile solution of alum in an amount that has been predetermined to produce a pH between 5.0 and 5.5. This solution is generally one containing 0.4 gram of hydrated papermakers' alum $(Al_2(SO_4)_3 \cdot 18H_2O)$ per 100 grams, or alternatively, the following (4b):

(4b) Sterile solutions of buffer salts to adjust the substrate to other pH values, if required as described hereinafter.

(5) Inoculum consisting of 1 milliliter of an aqueous suspension of the test organism. The two organisms which were used were Aerobacter aerogenes and Pseudomonas aeruginosa. Each suspension was prepared by harvesting, from nutrient agar cultures that had been incubated for 24 hours at 37° C., such an amount of cells in sterile distilled water as to provide a cell count in excess of approximately 1,000,000 per milliliter.

In cases where buffer salts were added (4b above), they were added in the form of a 5-milliliter portion of an undiluted mixture of 0.2-molar solutions. These buffer mixtures were each prepared by mixing the quantities of each of the 0.2-molar solutions that are specified in standard published buffer tables to obtain mixtures having the desired pH. Although, by adding 5 milliliters of such undiluted buffer mixtures to each pulp-substrate sample, each contained only a fraction (⅓ or less) of the quantity of the buffer salts that would be present in the standard buffer mixture at that concentration, this was immaterial, since the pH of a buffer mixture does not change substantially on dilution, and the quantities of buffer salts present in each of the pulp substrates were in the correct proportions to each other. The pH values of the resulting buffered pulp substrates were also checked electrometrically.

The buffer mixtures used for covering various pH ranges were prepared from the following solutions:

pH 4.0 to 5.0—0.2 M solutions of (1) potassium acid phthalate and (2) sodium hydroxide
pH 6.0 to 8.0—0.2 M solutions of (1) monopotassium phosphate and (2) sodium hydroxide The buffer mixtures that were used are those which are commonly referred to as Clark and Lubs' buffer mixtures, for whose exact compositions, tables should be consulted (see, for example, that in Snell and Snell, "Colorimetric Methods of Analysis," D. Van Nostrand Co., New York, 1948, third ed., vol. I, pages 170 to 177).

The three compositions which were used in this example are as follows:

K—Composition consisting of an aqueous solution containing 20.0 percent by weight of sodium cyanodithioimidocarbonate and 7.5 percent by weight of ethylenediamine.
L—Composition consisting of an aqueous solution containing each of the two active ingredients of Composition K in the proportions of 13.1 percent and 4.9 percent, respectively, and containing, in addition, 18 percent by weight of potassium N,N-dimethyldithiocarbamate.

M—Composition consisting of an aqueous solution containing each of the two active ingredients of Composition K in the proportions of 13.1 percent and 4.9 percent, respectively, and containing, in addition 18 percent by weight of potassium N-methyldithiocarbamate.

After the test organism had been added to the bottles, they were allowed to stand for a period between 18 and 20 hours at an incubation temperature of approximately 37° C., at which time a portion of the contents of each bottle was withdrawn, diluted, and plated on nutrient agar and incubated for 48 hours at 37° C. The number of colonies on each plate was determined and the results were converted to the number of colonies per milliliter of substrate.

Although the tests were performed over a wide range of pH values, only the results at pH 6.5, which are typical, appear in the table which follows. These results (reported as "percentage kill") obtained at the specified concentrations and at a pH of 6.5 are coded to the foregoing list of compositions.

| Organism and concentration | Percentage kill at pH 6.5 for composition— | | |
|---|---|---|---|
| | K | L | M |
| Aerobacter aerogenes, p.p.m.: | | | |
| 1 | 32 | 15 | 0 |
| 2 | 42 | 38 | 0 |
| 3 | 88 | 75 | 85 |
| 4 | 84 | 25 | 81 |
| 5 | 81 | 19 | 79 |
| 6 | 86 | 58 | 84 |
| 8 | 88 | 44 | 88 |
| 10 | 82 | 61 | 79 |
| 16 | 87 | 68 | 85 |
| 20 | 87 | 33 | 88 |
| Pseudomonas aeruginosa, p.p.m.: | | | |
| 5 | 12 | 35 | 49 |
| 10 | 89 | 35 | 92 |
| 20 | 77 | 0 | 94 |
| 40 | 22 | 0 | 99 |
| 60 | 7 | 87 | 99 |
| 80 | 0 | 99 | 99 |
| 100 | 42 | 87 | 99 |
| 120 | 88 | 83 | 99 |
| 140 | 95 | 94 | 99 |
| 200 | 97 | 95 | 100 |

The foregoing results indicate that the potassium N-methyldithiocarbamate (Composition M) does not affect the activity of the cyanodithioimidocarbonate (Composition K) against either of these slime-forming microorganisms, whereas the potassium N,N-dimethyldithiocarbamate (Composition L) impairs the inherent activity of the cyanodithioimidocarbonate.

For purposes of comparison, each of these three compositions was tested also against Sphaerotilus natans in tap water (rather than pulp substrate) in accordance with the method described in Example 1, with the results disclosed in the following table:

| Organism and concentration | Percentage kill at pH 6.9 for composition— | | |
|---|---|---|---|
| | K | L | M |
| Sphaerotilus natans, p.p.m.: | | | |
| 0.6 | 13 | 99 | 87 |
| 1.0 | 43 | 96 | 99 |
| 2.0 | 20 | 96 | 99 |
| 3.0 | 53 | 74 | 99 |
| 5.0 | 23 | 73 | 99 |
| 7.0 | 53 | 79 | 99 |
| 10.0 | 53 | 71 | 100 |
| 15.0 | 71 | 77 | 99 |
| 20.0 | 78 | 77 | 99 |
| 25.0 | 72 | 100 | 99 |

The foregoing results indicate that potassium N-methyldithiocarbamate (Composition M) is highly active against Sphaerotilus natans and that Composition L, containing potassium N,N-dimethyldithiocarbamate, represents only limited improvement over Composition K, which is devoid of either dithiocarbamate.

When the compositions disclosed in the present invention are used for control of iron bacteria and other slime-forming microorganisms in papermaking operations, they are preferably added continuously to the process water for 8 to 24 hours during each 24-hour period in such amounts as to provide in the water a concentration between approximately 0.1 and approximately 20 p.p.m. of the water-soluble salt of the N-alkyldithiocarbamic acid and, when used therewith, approximately an equal amount of the mixture of diaminoalkane and water-soluble cyanodithioimidocarbonate that is referred to hereinbefore. These additions may be made at any place in the process, for example, at the beaters or to the stock mixers, or to the white water being returned from the wire pit to the fan pump.

It is advantageous to recycle and reuse the white waters, since they contain significant proportions of fiber and other furnish components, as well as heat and a portion of the toxicant, all of which should be conserved. This can only be accomplished by adequate control of slime, since closed systems, in which the maximum amount of white water is recirculated, present slime control problems of increased difficulty. These problems probably are attributable to the increased amount of soluble nutrient materials, particularly those in the form of sugars, which accumulate therein, and also to its higher temperature, both of which are generally more favorable to growth of microorganisms.

The terms "alkali-metal" and "alkaline-earth-metal" have been used herein in accordance with their generally accepted meaning, and to include sodium, potassium, calcium, and barium, as well as the other less common metals of these groups.

Inasmuch as the foregoing specification comprises preferred embodiments of the invention, which were selected merely for purposes of illustration, it is to be understood that variations and modifications may be made therein in conventional manner and in accordance with the teachings thereof, without departing from the invention or its scope as defined in the appended claims.

We claim:

1. A pesticidal composition for use in the control of slimes that are the result of the growth and proliferation of iron bacteria as well as other species of slime-forming microorganisms consisting essentially of a water-soluble salt of an N-monoalkyl-substituted dithiocarbamic acid, the alkyl radical of which has fewer than four carbon atoms, and a water-soluble salt of cyanodithioimidocarbonic acid, each in an amount between approximately 5 and approximately 20 percent by weight of the composition.

2. A pesticidal composition as defined in claim 1 which contains, as an additional constituent, ethylene diamine in a molecular proportion that is not substantially in excess of 1.5 moles per mole of the cyanodithioimidocarbonate content of the composition.

3. A pesticidal composition for use in the control of slimes that are the result of the growth and proliferation of iron bacteria as well as other species of slime-forming microorganisms which consists essentially of an aqueous solution containing approximately 13.1 percent by weight of sodium cyanodithioimidocarbonate, approximately 4.9 percent by weight of ethylenediamine, and approximately 18.0 percent by weight of potassium N-methyldithiocarbamate.

4. A process for the control of iron bacteria in flowing-water systems which comprises adding to the water in such systems a water-soluble salt of an N-monoalkyl-substituted dithiocarbamic acid, the alkyl radical of which has fewer than four carbon atoms, in an amount sufficient to inhibit the growth and proliferation of iron bacteria.

5. A process as defined in claim 4 in which the amount of the N-monoalkyl-substituted dithiocarbamate is between approximately 0.1 and approximately 20 parts per million of the water.

6. In a process for the production of paper, the step which comprises adding to the process water a water-soluble salt of an N-monoalkyl-substituted dithiocarbamic acid, the alkyl substituent radical of which contains fewer than four carbon atoms, in an amount sufficient to inhibit growth of iron bacteria therein.

7. In the production of paper from an aqueous cellulosic pulp suspension, the method of inhibiting deterioration by the growth of iron bacteria in such pulp suspensions which comprises adding to the aqueous fluids between approximately 0.1 and approximately 20 parts per million of a water-soluble salt of an N-monoalkyl-substituted dithiocarbamic acid, the alkyl radical of which has fewer than four carbon atoms.

8. An aqueous suspension of cellulosic pulp intended for use in the production of paper or paperboard which is normally susceptible to microbiological deterioration by iron bacteria which contains, for the purpose of inhibiting such deterioration, between approximately 0.1 and approximately 20 parts per million of a water-soluble N-monoalkyl-substituted dithiocarbamic acid, the alkyl radical of which has fewer than four carbon atoms.

References Cited in the file of this patent

UNITED STATES PATENTS

| | | |
|---|---|---|
| 1,972,961 | Tisdale et al. | Sept. 11, 1934 |
| 2,588,428 | Stewart et al. | Mar. 11, 1952 |
| 2,686,119 | Buckman et al. | Aug. 10, 1954 |
| 2,791,605 | Dorman et al. | May 7, 1957 |
| 2,792,327 | Hunt | May 14, 1957 |
| 2,797,181 | Drexel | June 25, 1957 |
| 2,816,136 | Pera | Dec. 10, 1957 |